July 20, 1954
J. A. PSENKA
2,683,919
BROACH
Filed Dec. 17, 1951
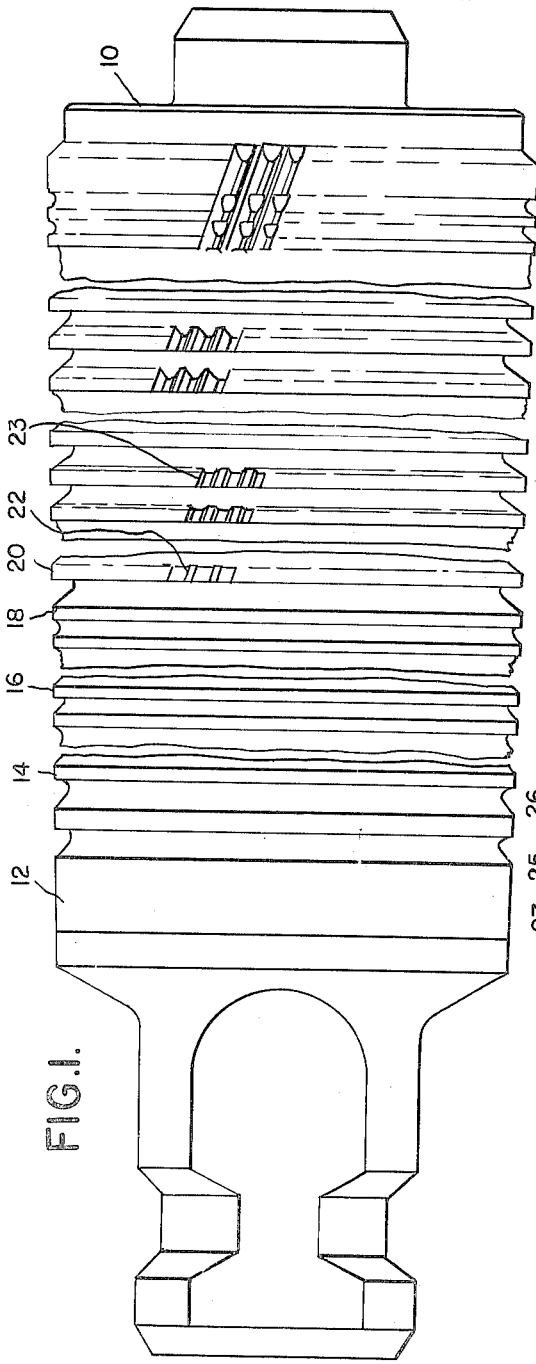
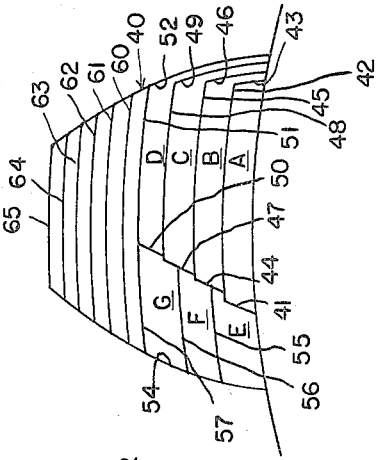
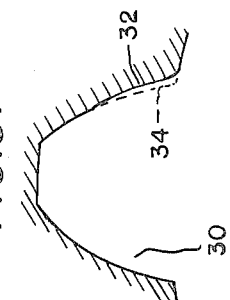
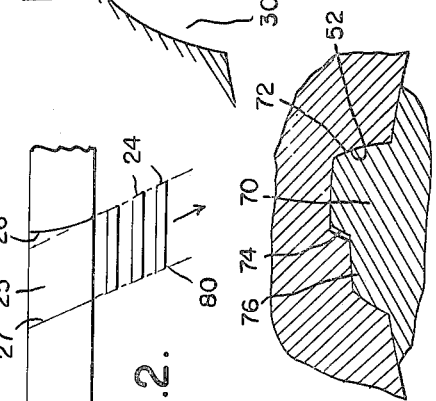
INVENTOR.
JOSEPH A. PSENKA
BY *Whittemore,*
*Hulbert & Belknap*
ATTORNEYS Patented July 20, 1954

2,683,919

UNITED STATES PATENT OFFICE 2,683,919

BROACH

Joseph A. Psenka, Detroit, Mich., assignor to National Broach & Machine Company, Detroit, Mich., a corporation of Michigan Application December 17, 1951, Serial No. 261,987

4 Claims. (Cl. 29—95.1)

The present invention relates to a broach and more particularly, to a broach designed to cut helical teeth, tooth spaces, splines or splineways, when drawn through a hole in a work piece.

Broaches are used today to form very accurate work pieces and in general, the accuracy built into the broach is of such high degree that best results are obtained when the surfaces of the broach are employed to establish and maintain guiding action between the broach and the work piece. However, before accurate helical guiding action can be established between a broach and work piece, it is necessary for the first few teeth of the broach to have cut to substantial depth in the work piece. In practice it is found that if the coaction between the broach and work piece is depended upon to establish and maintain the necessary rotation between the broach and work piece to cause the teeth of the broach to move in a helical path relative to the work piece, there is a tendency to set up relative "drift" as the first few teeth come into guiding action. This has the result of removing material from the work piece at the acute side of the tooth as the broach forms the tooth space, thus producing imperfect teeth in the finished work piece.

According to the present invention this difficulty is overcome by providing a series of broach teeth, the first group of which is designed to cut a tooth space substantially narrower than the final desired tooth space in the work piece, to a depth sufficient to establish proper guiding action at the side of the broach tooth provided with an obtuse cutting corner. During this cut, drift occurs, but its harmful results are removed by the following teeth. After the guiding action has been established, a second group of teeth follows the first group and enlarges the initial slot to full width and to the same depth as the slot cut by the first group of teeth. Thus, the first group of teeth in cutting the initial guiding slot, are subject to drift so that one corner of the guiding slot produced by the acute side of the broach tooth is somewhat rounded off. However, the other surface is strictly a true helicoidal surface of true involute or other desired form and is used to maintain guiding action between the broach and the work piece as the second group of teeth comes into action and removes the metal including the rounded off acute corners in the work piece.

It is accordingly an object of the present invention to provide a broach for cutting helical members, characterized in that it completely avoids deforming the sides of the teeth on the work piece produced by the acute side of broach teeth.

It is a further object of the present invention to provide a broach adapted to produce strictly true helicoidal surfaces on the work piece while depending primarily on the broach and work piece to establish relative helical guiding action therebetween.

It is a feature of the present invention to provide a broach having a series of helical teeth, the first group of such teeth being of less than final desired tooth width and being radially stepped, and a second group of teeth adapted to enlarge the slot cut by the first group of teeth to full width and to the same depth as the slot cut by the first group of teeth, while maintaining guiding action between a helicoidal surface cut by the first group of teeth and a helicoidal surface provided on the second group of teeth.

Other objects and features of the invention will become apparent as the description proceeds, especially when taken in conjunction with the accompanying drawings, wherein:

Figure 1 is a fragmentary elevational view of a broach with parts broken away.

Figure 2 is a diagrammatic view of a portion of a work piece and broach teeth illustrating the results of drift on lead.

Figure 3 is a diagrammatic view illustrating the results of drift on form.

Figure 4 is a diagrammatic view illustrating the stepped arrangement of the teeth.

Figure 5 is a fragmentary enlarged transverse section through the broach showing the general form of one of the cutting teeth.

The broach 10, shown in Figure 1, includes a pilot 12 followed by a series of circular blades 14, 16 and 18 adapted to cut the hole in the work piece to true circular shape. These may be omitted if the work is initially bored to size. Thereafter, there is provided a series of blades comprising a first group commencing with the blade 20 having helically disposed teeth 22 designed to cut helical slots in the work piece which are of less width than the final desired width of slot or tooth space. Sufficient of these teeth are provided to cut a slot to sufficient depth to establish true guiding action. The succeeding group of teeth, designated herein as 23, include first portions of a height corresponding to the depth of cut made by the first group of teeth and adapted to maintain guiding action with the side of the slot cut by the obtuse side of the broach teeth. The second group of teeth includes second portions which are stepped so as to enlarge the slot cut by the first group of teeth to final desired width and to the same depth as the slot cut by the first group of teeth. When the second group of teeth has passed through the work piece a true helicoidal slot with true involute or other desired form on both sides, has been formed therein of such depth to maintain guiding action for the remainder of the broach, and the remaining broach blades are or may be of conventional form, increasing the slot, tooth space or splineway to final desired depth and shape.

It is important that the first group of teeth be in helical alignment with the portions of the remaining teeth carrying the obtuse cutting corners since it is at the opposite corners of the broach teeth (the acute side) and tooth spaces in the work piece where drift produces the undesired rounding off of the acute corner of the work piece tooth, and resulting in loss of the desirable form.

Referring now to Figure 2, there is illustrated a succession of helically disposed broach teeth 24 which have formed a slot or tooth space 25 in a work piece by moving in the direction of the arrow. As a result of drift, the side 26 of the tooth space which was cut by the acute cornered sides of broad teeth 24 is deformed, the deformation appearing as a rounding off thereof as shown in the figure. Thus, both lead and profile of the broached surface 26 is in error. On the other hand, the side 27 of the space 25 shows no error and is correct throughout as to lead and profile.

In Figure 3 there is shown the form error produced by drift. Here a tooth space 30 is intended to be involute. However, due to drift, one side has an error as shown by full line 32 which is displaced from the desired involute form, a portion of which is shown in dotted lines at 34.

Referring now to Figure 4 there is illustrated the action of the broach in producing a tooth space 40 which is shown as of involute form, but which may have any other desired form. It will be understood that cuts per tooth are greatly exaggerated for clarity.

The first tooth of the first group of teeth is narrower than the desired final width of tooth space and is shaped to remove metal from the space A, bounded by lines 41, 42 and 43. Due to drift, the second tooth, herein indicated as of the same width but of increased height, fails to track or follow the first tooth, and removes metal from the space B, bounded by lines 44, 45 and 46. In like manner the third tooth removes metal from the space C, bounded by lines 47, 48 and 49, and the fourth tooth removes metal from the space D, bounded by lines 50, 51 and 52. By this time the tooth space is cut to sufficient depth so that following teeth will engage the surface indicated by line 52 and maintain true lead. However, the opposite surface of the tooth space has drift errors in both lead and form.

To correct these errors, a second series of teeth is provided which have side portions taking a bearing against the tooth space surface indicated by the line 52. The opposite sides of these teeth are stepped to widen the tooth space to final desired width. The first tooth of the second series is shaped to remove metal from the space E, bounded by the surface 54 and line 55. The second tooth of the second series removes metal from the space F, bounded by lines 54 and 56. The third tooth removes metal from the space G bounded by lines 54 and 57. At this time the tooth space is cut to sufficient depth to furnish adequate guiding action for the balance of the operation, and at the same time is widened to final desired width and all drift errors have been removed.

It will be observed that metal from the spaces E, F and G was removed with fewer teeth than was required for cuts A, B, C and D.

The following teeth complete the broaching operation by cutting successively to depths indicated by lines 60, 61, 62, 63, 64 and 65.

One important advantage of the present invention is that the teeth of the second and following series cut primarily with their tops, and the sides of such teeth do not require backing off, thus preserving form while permitting repeated resharpening.

Figure 5 illustrates a typical tooth in the second series. Here the tooth is indicated at 70, and for comparison may be considered as the second tooth in the second series designed to remove metal from space F in Figure 4. The tooth 70 has a portion at one side including a side surface 72 designed to contact the surface 52 substantially to full depth. This portion of the tooth 70 is shaped to provide clearance as indicated at 74 with the opposite side of the tooth space. The portion 76 of the tooth is stepped radially with respect to the corresponding portion of the preceding tooth in the second series to take the prescribed cut.

While for simplification, the number of teeth making up the first and second groups has been indicated at four and three respectively, it will be apparent that in practice the corresponding action will be distributed over many more teeth. Thus for example, in a typical broach the teeth making up the first and second groups are approximately sixty in number. However, the principle involved remains the same.

It is important to note that the side of the tooth designed to cut the initial guide slot defined by the surfaces 50, 51 and 52 is at the side of the tooth provided with the obtuse angled cutting edge 80, as seen in Figure 2.

In general, the invention is applicable to the production of helical teeth or tooth spaces, splines or splineways in a work piece, and comprises a first group of teeth designed to form a guide slot in the work piece, one side of which is a true helicoidal surface of true profile and the other side of which includes an acute corner which has been rounded off and deformed as to profile due to drift. The broach includes a second group of teeth designed to follow the first group and to enlarge the slot to full width while employing the true helicoidal surface as a guiding surface. Thus, the side of the guide slot which initially contained the rounded off acute corner due to drift is removed by the second group of teeth and the initial guide slot enlarged to full width and to the same depth as cut by the first group of teeth, after which conventional broach teeth provide the requisite guiding action while the teeth are radially stepped to cut the tooth space to full size.

The invention is useful whether or not a lead bar is employed to assist in establishing lead, and is of course applicable when either the broach or work is held against rotation while the other part is permitted to rotate.

The drawings and the foregoing specification constitute a description of the improved broach in such full, clear, concise and exact terms as to enable any person skilled in the art to practice the invention, the scope of which is indicated by the appended claims.

What I claim as my invention is:

1. A broach for broaching helical teeth comprising a series of cutting teeth disposed in helical alignment on said broach for cutting a helical tooth space on a work piece, each of said teeth having a front cutting face having an acute corner and an obtuse corner, said series comprising a first group of radially stepped teeth having a width substantially less than the final width to be cut at the top of the tooth space, said first group of teeth terminating in a tooth of a predetermined substantial height, a second group of teeth having first portions at the obtuse cutting edge side thereof of approximately the same predetermined height as the last tooth in said first group, the cutting edges of both of said groups of teeth at the obtuse side of said teeth occupying a helicoidal surface to maintain helical guiding action with the outer side of the tooth space previously cut by said first group, and second portions stepped to cut the tooth space to full final width and to the same depth as the space cut by said first group while accurately guided in a helical path by engagement between a side of the tooth space cut by the first group and and the first portion of the teeth of said second group.

2. A broach as defined in claim 1 in which the second group of teeth has second portions stepped radially of the broach to said predetermined height.

3. A broach as defined in claim 1 in which the second group of teeth have unrelieved side surfaces occupying the helicoidal paths defined by their cutting edges.

4. A broach for broaching helical tooth spaces in a work piece comprising a series of teeth disposed generally in a helical arrangement, each of said teeth having an obtuse and an acute side cutting edge at the front thereof, all of said obtuse cutting edges being disposed to occupy a true helicoidal path, the leading teeth of said broach being narrower than following teeth thereof the said following teeth at the side thereof having acute side cutting edges being progressively stepped to remove drift errors after sufficient teeth have acted on the work piece to establish a true and accurate guiding action between obtuse sides of the broach teeth and the surfaces of the work piece cut thereby.

References Cited in the file of this patent

UNITED STATES PATENTS

| Number | Name | Date |
| --- | --- | --- |
| 2,011,630 | Halborg | Aug. 20, 1935 |
| 2,060,889 | Nilsson | Nov. 17, 1936 |
| 2,305,028 | Phaneuf | Dec. 15, 1942 |